(12) United States Patent
Staub

(10) Patent No.: US 6,251,526 B1
(45) Date of Patent: Jun. 26, 2001

(54) COATED CAST PART

(75) Inventor: Fritz Staub, Seuzach (CH)

(73) Assignee: Sulzer Innotec AG, Winterthur (CH)

( * ) Notice: Subject to any disclaimer, the term of this patent is extended or adjusted under 35 U.S.C. 154(b) by 0 days.

(21) Appl. No.: 09/243,171

(22) Filed: Feb. 2, 1999

(30) Foreign Application Priority Data

Feb. 5, 1998 (EP) ................................................ 98810087

(51) Int. Cl.⁷ .............................. B32B 5/18; B32B 3/12; F01D 11/12; F04D 29/08
(52) U.S. Cl. ......................... 428/550; 428/593; 428/609; 428/613; 428/621; 428/632; 428/633; 415/173.4; 415/173.5; 415/174.4; 415/174.5
(58) Field of Search ...................................... 428/613, 550, 428/593, 609, 621, 632, 633; 415/173.4, 173.5, 174.4, 174.5; 416/241 B, 241 R

(56) References Cited

U.S. PATENT DOCUMENTS

| 4,209,334 | * | 6/1980 | Panzera . |
| 4,273,824 | * | 6/1981 | McComas et al. . |
| 4,639,388 | * | 1/1987 | Ainsworth et al. . |
| 4,867,639 |   | 9/1989 | Strangman . |
| 5,057,379 | * | 10/1991 | Fayeulle et al. . |
| 5,064,727 |   | 11/1991 | Naik . |

FOREIGN PATENT DOCUMENTS

| 533531 | 12/1981 | (AU) . |
| 8411277 U | 9/1986 | (DE) . |
| 0067746A1 | 12/1982 | (EP) . |
| 2513723 | 4/1983 | (FR) . |
| 1169347 | 11/1969 | (GB) . |
| 2010711A | 7/1979 | (GB) . |
| 2062115A | 5/1981 | (GB) . |
| WO 97/22566 | 6/1997 | (WO) . |

* cited by examiner

Primary Examiner—Deborah Jones
Assistant Examiner—Jason Savage
(74) Attorney, Agent, or Firm—Townsend and Townsend and Crew LLP

(57) ABSTRACT

The cast part (1) comprises a basic body (2) of a first material and a coating of at least one second material. The second material is applied to a co-cast skeleton structure (3) on the surface (20) of the basic body, with it forming a covering (4) or a covering layer (42).

22 Claims, 3 Drawing Sheets

COATED CAST PART

The invention relates to a coated cast part in which a skeleton structure is cast on the surface of a basic body and onto which a coating is applied. This invention relates to to uses of a cast part of this kind and to a turbine blade which represents an example of the cast part in accordance with the invention.

BACKGROUND OF THE INVENTION

It is essential for a good efficiency of a gas turbine or an aeroplane engine that sealing gaps between the turbine blades and the housing are made very small. Under adverse operating conditions a scraping between the blade tips and the inner surface of the housing can result. For this reason "abradables" have been developed as a coating of the housing surface. In the event of a scraping, the blade tips release fine particles from the abradable layers without their being damaged thereby. The abradable layers are manufactured in particular by thermal spraying on of ceramic powders (e.g. "HVFS" or "APS", i.e. high velocity flame spraying or atmospheric plasma spraying). It is known that the thermal expansion of a ceramic coating is substantially less than that of a coated metallic basic body. Therefore, due to the high operating temperatures, suitable intermediate layers ("bond coats") must be provided which counteract a breaking off of the coating.

Similar problems are present in combustion chambers of gas turbines, in inlet segments or in guide blades. Heat insulating coatings of a ceramic material must be suitably anchored on a surface to be screened off.

Thick ceramic coatings adhere to a basic body as a rule only when a bond coat has been previously applied to it. Such bond coats often contain oxidisable components. A ceramic coating of zirconium oxide is permeable to oxygen ions at high temperatures. Therefore an oxidation of the bond coat can result which—if it is combined with a volume increase—can lead to a breaking off of the coating.

SUMMARY OF THE INVENTION

The object of the invention is to provide a coated cast part which comprises means with which a coating adheres well to a basic body to be coated in spite of greatly differing coefficients of expansion. This object is satisfied by the cast part covered by a skeleton structure which is adhered to the surface of the cast part and onto which a coating is applied. Thanks to a special structuring of the surface, the basic body of this cast part forms a substrate for a thick ceramic layer which is tolerant of expansion and at the same time has good anchoring properties for this layer.

The cast part has a basic body of a first material and a coating of at least one second material. The second material is applied on a co-cast skeleton structure at the surface of the basic body, with it forming a covering or cover layer.

The special coatings and geometrical properties of the skeleton structure which are particularly advantageous with respect to the cases usually occurring in which the surfaces to be coated are curved. A relief-like surface structuring which is, for example, suitable for a shaft seal of a flow machine in the form of a labyrinth seal. Use of the coating in accordance with the invention as a functional element in various apparatuses is disclosed. A turbine blade is a further example of a cast part in accordance with the invention.

BRIEF DESCRIPTION OF THE DRAWING

The invention will be explained in the following with reference to the drawings. Shown in enlarged form are.

DESCRIPTION OF THE PREFERRED EMBODIMENT(S)

Figure 1:
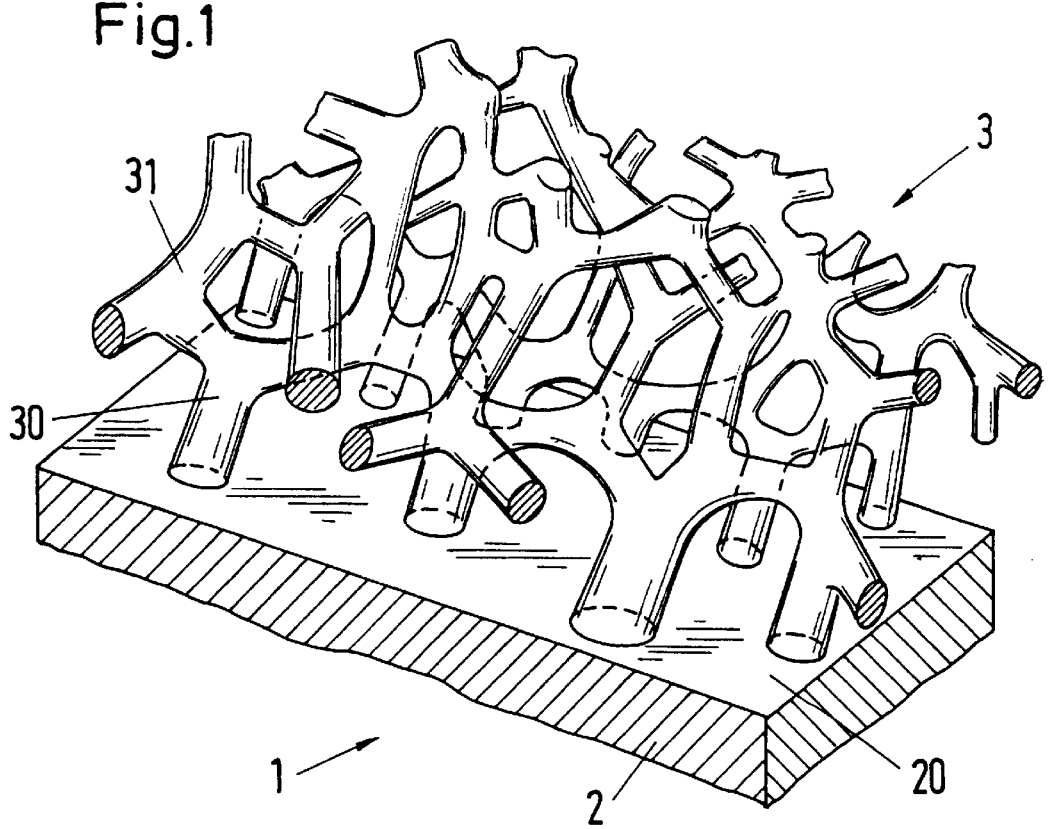
FIG. 1 is a section of a cast part in accordance with the invention without a coating, of which the skeleton structure is formed as a three dimensional network.

The cast part in accordance with the invention can be manufactured with a precision casting technique, with a ceramic casting mould being formed by making a cast, for example, of a wax model and firing the thus formed mould. In this, a skeleton structure—likewise of wax—can be mounted on a wax model of a basic body. The model for the skeleton structure can also be manufactured of an open pored plastic foam of which the wall elements have been thickened with wax. FIG. 1 shows a corresponding example: A skeleton structure 3 having the form of a three dimensional network is applied to a basic body 2 of a cast part 1. The skeleton structure 3 with webs 31 is connected to the surface 20 of the basic body 2 via pillars 30. The mould is arranged during casting in such a manner that the melt flows in it through cavities for the pillars 30 into cavities for the webs 31.

Figure 2:
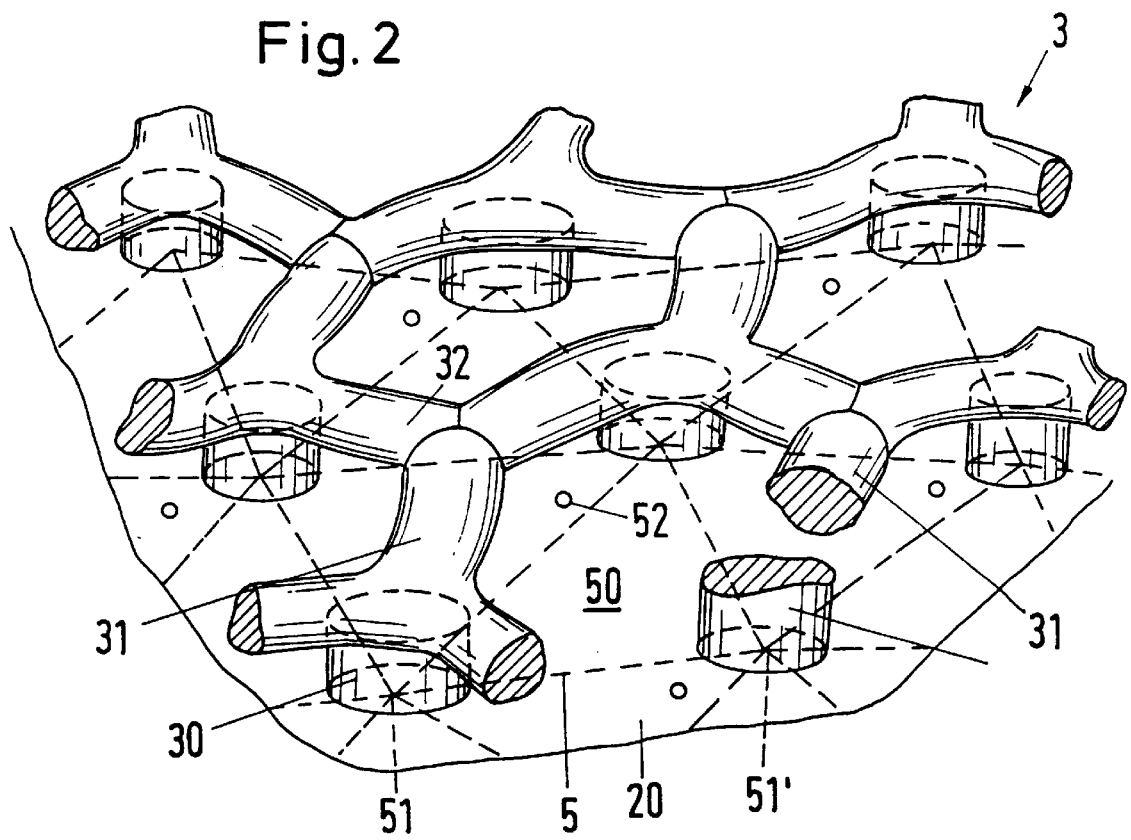
FIG. 2 is a largely two dimensional skeleton structure.

FIG. 2 shows a skeleton structure 3 in which a second two dimensional network or grid of webs 31 is placed on pillars 30. The pillars 30 are arranged on corner points 51 and 51' of a network 5 consisting of triangles 50. All distances of the corner points 51 to adjacent corner points 51' are approximately equally large. Three webs 31 go out in each case from the pillars 30; three webs 31 meet in each case in a branch point 32 disposed freely above the basic body 2, and indeed above the triangles 50 marked with a small circle 52. (This holds only for an inner region of the structure 3; Exceptions in the boundary regions: two webs 31 going out from a pillar and no branch points 32). As is seen, only one marked triangle belongs to each pair of adjacent triangles 50, which can thus be associated in each case to only one branch point 32.

Figure 3:
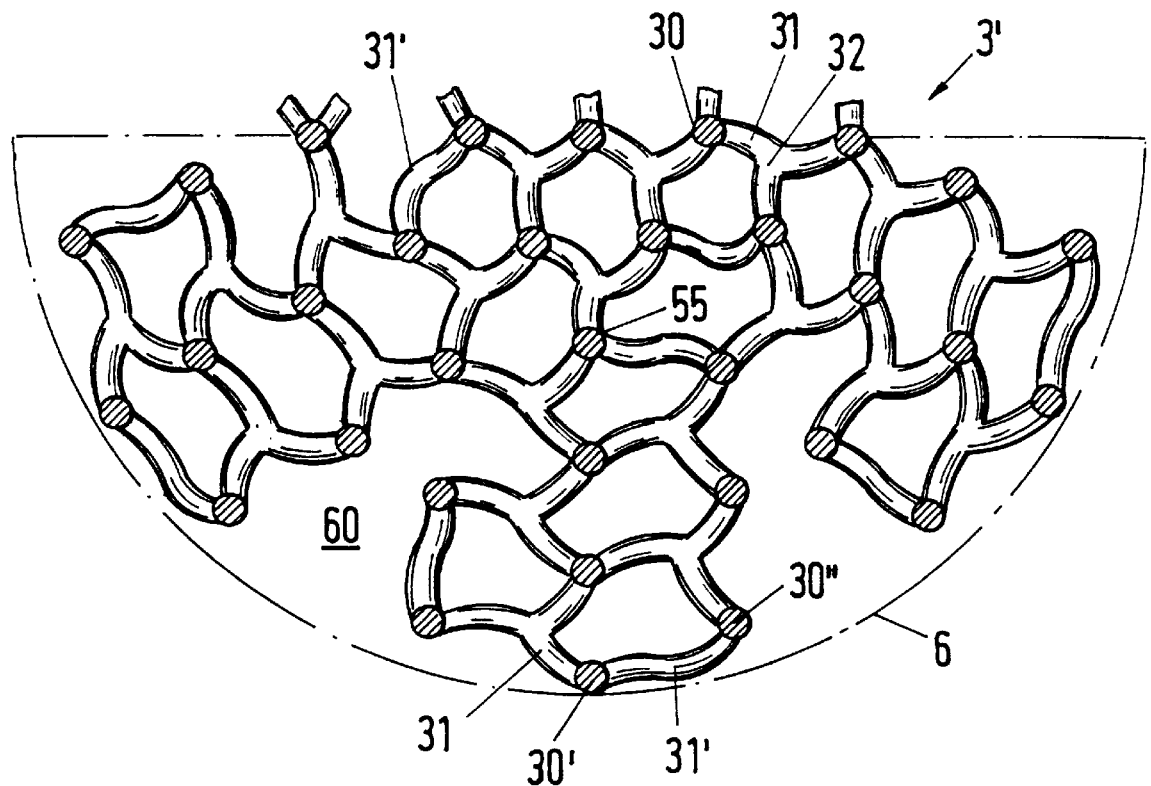
FIG. 3 is a part of a wax mould for the manufacture of a skeleton structure by means of precision casting.

The webs 31 can be straight or curved between the pillars 30 and the branch points 32. The skeleton structure 3 illustrated has a network of webs 31 which is substantially a hexagonal grid. A wax model of this structure 3 can be applied particularly well to a curved surface 20 if the latter does not strongly deviate from a plane. If the curvatures are large, then partial surfaces of the wax model can also be cut out and removed. FIG. 3 shows a planar wax model 3' (only one half 6 illustrated, seen from below) which is suitable for the covering of a hemisphere. Web-free indentations 60 enable an adaptation which results in a largely uniform covering of the spherical shape. It can be seen from FIG. 3 that as a rule only two webs 31, 31' are in each case associated with the pillars 30' in the boundary region, with the web 31' forming a direct connection to the adjacent pillar 30" without a branch point 32.

The distances between adjacent corner points 51 and 51' (see FIG. 2) typically have values in the range from about 2 to 5 mm. The distance of the webs 31 from the basic body 2 is on the order of magnitude of 1 mm.

In a hexagonal grid, six triangles meet in each case at the node points 51 of the network 5. Deviations are however also possible, for example node points 55 (see FIG. 3) with which only five triangles can be associated.

Instead of a hexagonal grid, grids with tetragonal or triangular structure elements can also be provided. Grid variants of this kind are however less suitable for the structuring of curved surfaces. This is particularly clearly the case in grids with triangular structure elements.

Figure 4:
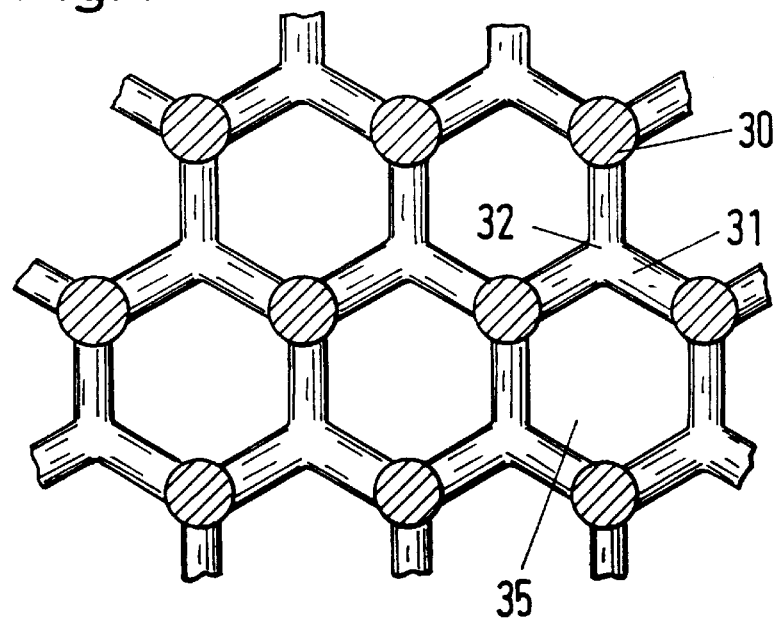
FIG. 4 is a regular hexagonal network for a skeleton structure.

Whereas FIG. 2 sectionally shows a skeleton structure 3 with a generalised hexagonal grid in an oblique view, FIG. 4 shows a regular embodiment of this grid. As already was the case in FIG. 3, it is a view from the basic body 2 (see FIG. 1), with the pillars 30 appearing as cross-sectional surfaces. The webs have widths of about 15–30% of the average diameter of a hexagonal unit cell 35 of the grid.

Figure 5:
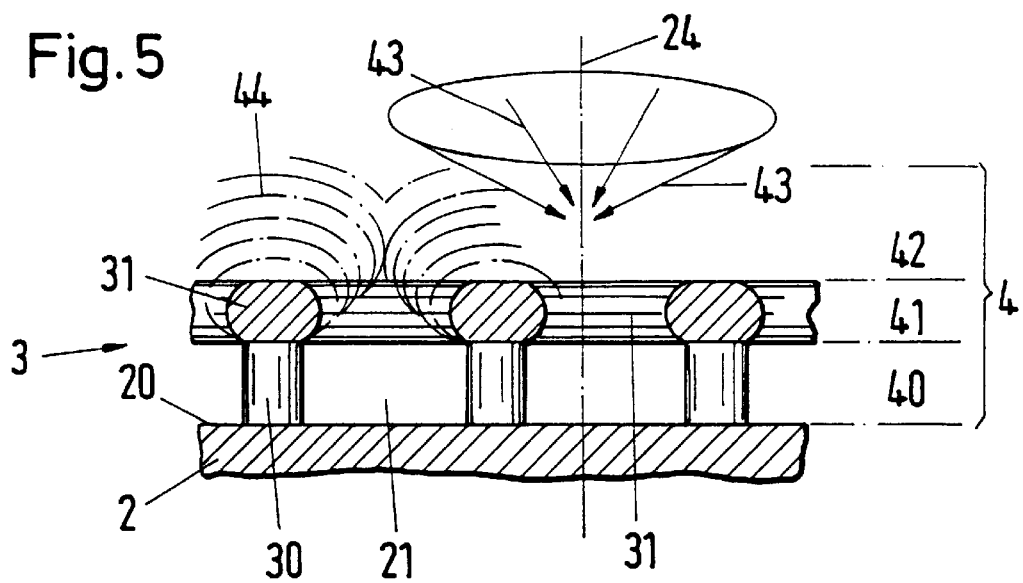
FIG. 5 is a cross-section through a cast part in accordance with the invention, in the coating of which cavities arise.

In accordance with the invention the basic body 2—see FIG. 5—has a covering 4 which can be manufactured by a thermal spraying process. The construction of the covering depends on the angle of the direction 43 at which the spray jet is incident during the spraying onto the cast part 1. If this angle is small, then large cavities 21 result between the pillars 30 depending on the skeleton structure. If the coating is done while the cast part 1 is being uniformly rotated about an axis 24 perpendicular to the surface 20, then a coating 42 with a uniform build-up results, which is indicated by the lines 44 drawn in chain dotting. A covering 4 of the basic body 2 comprises finally three zones: a zone 40 with pillars 30 of the skeleton structure 3 and cavities 21; a zone 41 which comprises the grid of the webs 31, the coating material and the cavities; as well as a zone 42 which represents the actual coating and which is anchored in the middle zone 41. The zone 40 is the base region of the covering 4, the zone 41 the anchoring region and the zone 42 the cover layer or coating.

Figure 6:
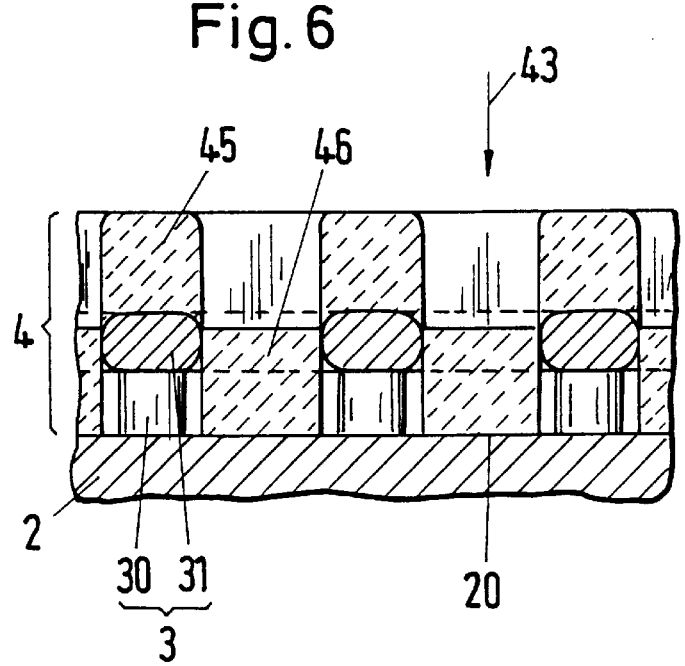
FIG. 6 is a cross-section through a cast part in accordance with the invention of which the skeleton structure forms a basis for a surface structuring which is relief-like, and FIG. 7 is a turbine blade with coatings in accordance with the invention at the tip and in a base region.

FIG. 6 shows a covering 4 in the manufacture of which the direction 43 of the spray jet has been chosen normal to the surface 20. The skeleton structure 3 forms a basis for the covering layer 4 in this case, through which a relief-like surface structuring results with elevations 45 and depressions 46. A surface structuring of this kind can be used for the shaft seal of a flow machine when suitably executed, e.g. as a labyrinth seal.

The two coverings 4 illustrated in FIGS. 5 and 6 represent two extreme cases. Through a suitable execution of the skeleton structure 3 and a suitable guidance of the spray jet, coatings can also be manufactured which have a largely planar surface and contain no larger cavities.

Different materials can also be used for the coating. Thus it can be advantageous if, in addition to the ceramic powder, metallic powder particles are admixed to the powder which is first applied to the skeleton structure so that a "cermet" forms. A compensatory transition between the metallic basic body and the ceramic coating thereby results.

Figure 7:
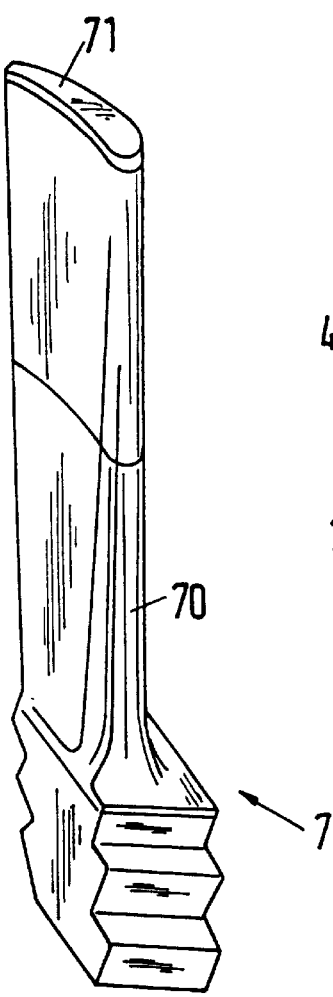

FIG. 7 shows a turbine blade 7 which is formed in the shape of a cast part in accordance with the invention. Coatings 71 and 70 respectively which are anchored on skeleton structures are applied to the blade tip and in a region of the base of the blades. The coating 71 of the blade tip serves as an armouring so that it is not damaged when coming into contact with an abradable layer. The coating of the base region 70 is provided as a heat insulation; it is intended to reduce a flowing off of heat into the wheel which bears a blade. In the coating 70, the coating with cavities in accordance with FIG. 5 is particularly advantageous.

Alloys which do not oxidise at the high operating temperatures are advantageously used as a material for the basic body. Thus the problems discussed, which are observed in oxidisable intermediate coatings, no longer arise.

What is claimed is:

1. A cast part with an applied exterior coating comprising:

a cast basic body (2) having an exterior substrate surface (20) for receiving the applied exterior coating (4);

a skeleton structure (3) for forming a part of the applied exterior coating (4) overlying the cast basic body (2) at the exterior substrate surface (20), the skeleton structure (3) having a grid and attachment for the grid to the exterior substrate surface (20) of the cast basic body (2);

the grid comprising interconnected structural elements (31) joined at branch points (32);

the attachment for the grid comprising a plurality of pillars (30) having attachment to the cast basic body at the substrate surface (20) at one end and to the structural elements (31) for supporting grid at an opposite end, the attachment for the grid supporting the grid overlying the substrate surface (20) of the cast basic body (2); and, an applied exterior coating (4) applied over and through the skeleton structure (3) toward the substrate surface (20) of the cast basic body (3).

2. The cast part with an applied exterior coating according to claim 1 wherein the grid comprises a two dimensional network.

3. The cast part with an applied exterior coating according to claim 1 wherein the grid comprises a three dimensional network.

4. The cast part with an applied exterior coating according to claim 1 wherein the applied exterior coating (4) defines depressions (46) between elevations (45) to relieve at intervals at least part of a coating zone (43).

5. The cast part with an applied exterior coating according to claim 1 wherein cast basic body (2) is a metallic alloy.

6. The cast part with an applied exterior coating according to claim 1 wherein the applied exterior coating (4) is a ceramic.

7. The cast part with an applied exterior coating according to claim 1 wherein the applied exterior coating (4) is a thermally sprayed ceramic.

8. The cast part with an applied exterior coating according to claim 1 wherein applied exterior coating (4) defines cavities (21) immediately above substrate surface (20) of cast basic body (2).

9. The cast part with an applied exterior coating according to claim 1 wherein the grid comprising interconnected structural elements (31) joined at branch points (32) forms a network (5) of triangles (50) having corner points (51).

10. The cast part with an applied exterior coating according to claim 9 wherein the corner points (51) are equidistant.

11. The cast part with an applied exterior coating according to claim 9 wherein the corner points (51) are distant from one another in the range between 2 and 5 mm.

12. The cast part with an applied exterior coating according to claim 1 wherein the attachment for the grid maintains the grid at 1 mm from the substrate surface (20).

13. The cast part with an applied exterior coating according to claim 1 wherein the pillars (30) attach to the grid at the branch points (32).

14. The cast part with an applied exterior coating according to claim 1 wherein the pillars (30) attach to the grid between the branch points (32).

15. The cast part with an applied exterior coating according to claim 1 wherein the pillars (30) attach to the grid at alternate branch points (32) to define an hexagonal pattern (35).

16. The cast part with an applied exterior coating according to claim 15 wherein the interconnected structural elements (31) are in the range of 15 to 30% of the average diameter of the hexagonal pattern (35).

17. The cast part with an applied exterior coating according to claim 1 wherein the cast basic body (2) having an exterior substrate surface (20) for receiving the applied exterior coating (4) is a turbine blade (7) having a base for attachment to a shaft and a tip extending away from the shaft.

18. The cast part with an applied exterior coating according to claim 17 wherein the applied exterior coating (4) is heat insulation applied to the base of the turbine blade (7).

19. The cast part with an applied exterior coating according to claim 17 wherein the applied exterior coating (4) is applied to the tip of the turbine blade (7).

20. A cast part with an applied exterior coating comprising:
- a cast basic body (2) having an exterior substrate surface (20) for receiving the applied exterior coating (4);
- a skeleton structure (3) for forming a part of the applied exterior coating (4) overlying the cast basic body (2) at the exterior substrate surface (20), the skeleton structure (3) having a grid and attachment for the grid to the exterior substrate surface (20) of the cast basic body (2);
- the grid comprising interconnected structural elements (31) joined at branch points (32);
- the grid overlying the substrate surface (20) of the cast basic body (2);
- an applied exterior coating (4) applied over and through the skeleton structure (3) toward the substrate surface (20) of the cast basic body (3)
- the applied exterior coating (4) defining cavities above substrate surface (20) of cast basic body (2).

21. The cast part with an applied exterior coating according to claim 20 wherein the cavities (21) are defined immediately above the substrate surface (20).

22. The cast part with an applied exterior coating according to claim 20 wherein the cavities are defined by elevations (45) and depressions (46) in the applied exterior coating (4).

* * * * *